(12) United States Patent
Valle

(10) Patent No.: US 9,510,564 B2
(45) Date of Patent: Dec. 6, 2016

(54) TREAT DISPENSER

(71) Applicant: Doskocil Manufacturing Company, Inc., Arlington, TX (US)

(72) Inventor: Andrea M. Valle, Stanhope, NJ (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 13/899,042

(22) Filed: May 21, 2013

(65) Prior Publication Data

US 2014/0345532 A1 Nov. 27, 2014

Related U.S. Application Data

(60) Provisional application No. 61/650,124, filed on May 22, 2012.

(51) Int. Cl.
*A01K 15/02* (2006.01)
*A01K 5/01* (2006.01)
*A01K 11/00* (2006.01)

(52) U.S. Cl.
CPC .......... *A01K 15/025* (2013.01); *A01K 5/0114* (2013.01); *A01K 15/026* (2013.01)

(58) Field of Classification Search
CPC .............................. A01K 15/025; A01K 15/026

USPC ................... 119/702, 707, 709–11
See application file for complete search history.

(56) References Cited

U.S. PATENT DOCUMENTS

| | | | | |
|---|---|---|---|---|
| 6,074,270 | A * | 6/2000 | Wilcox et al. ................ | 446/370 |
| 6,253,712 | B1 * | 7/2001 | Johnson ........................ | 119/707 |
| 7,066,411 | B2 * | 6/2006 | Male et al. ................... | 239/587.1 |
| 7,810,455 | B2 * | 10/2010 | Axelrod et al. .............. | 119/709 |
| 2011/0297104 | A1 * | 12/2011 | Axelrod et al. .............. | 119/709 |
| 2012/0204809 | A1 * | 8/2012 | Axelrod et al. .............. | 119/709 |
| 2013/0092097 | A1 * | 4/2013 | Cooper ................ | A01K 15/026 119/707 |
| 2016/0113243 | A1 * | 4/2016 | Mullin ..................... | A01K 5/00 119/709 |

* cited by examiner

*Primary Examiner* — Lisa Tsang
(74) *Attorney, Agent, or Firm* — Global IP Counselors, LLP

(57) ABSTRACT

One embodiment of a treat dispenser for an animal comprises a support and a plurality of coaxially stackable and nestable pods slidably disposed along the support, each pod having an interior for receiving a treat, a sidewall, a first opening and a second opening coaxial with the first opening, the first opening being dimensioned for slidable movement along the support, the second opening being larger than the first opening for the dispensing of treats to an animal.

14 Claims, 13 Drawing Sheets

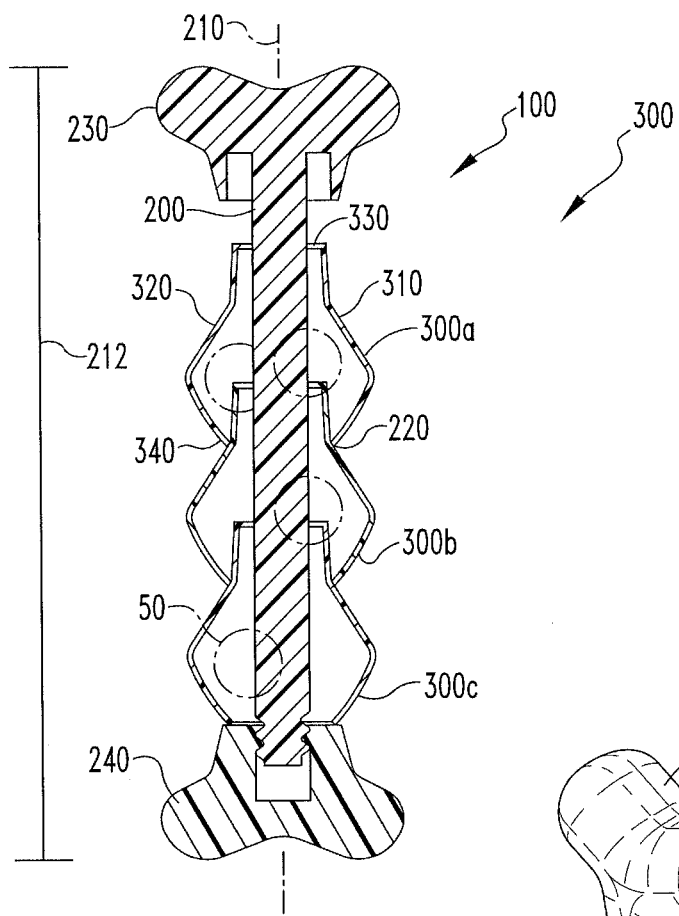
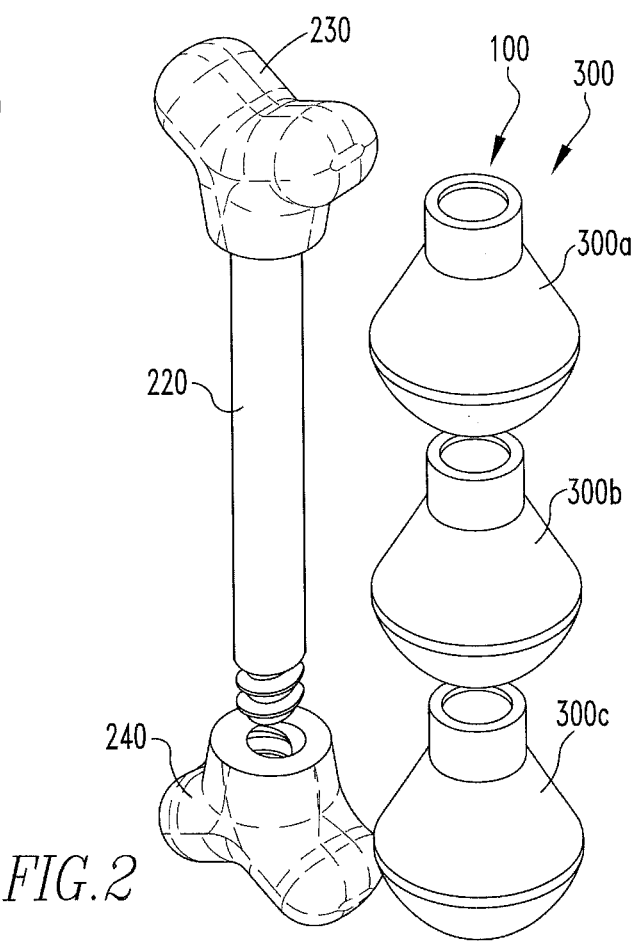
FIG.1
FIG.2

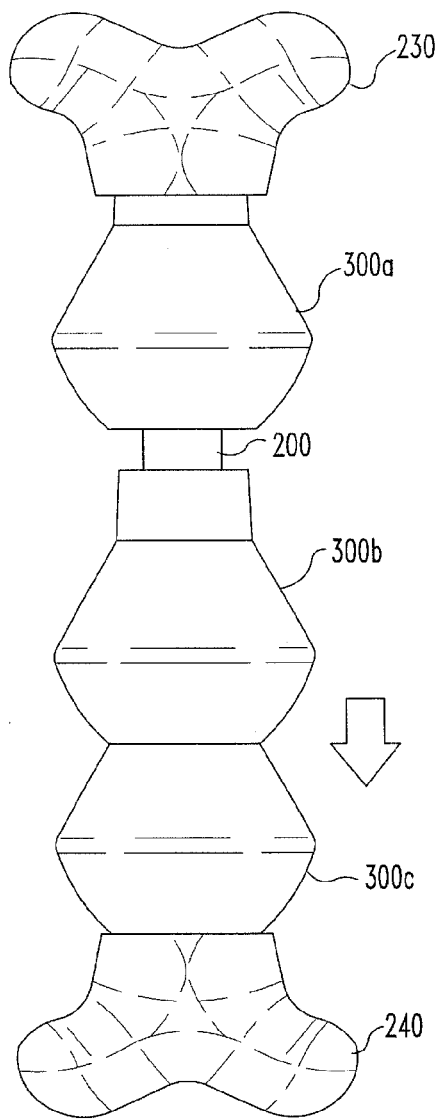
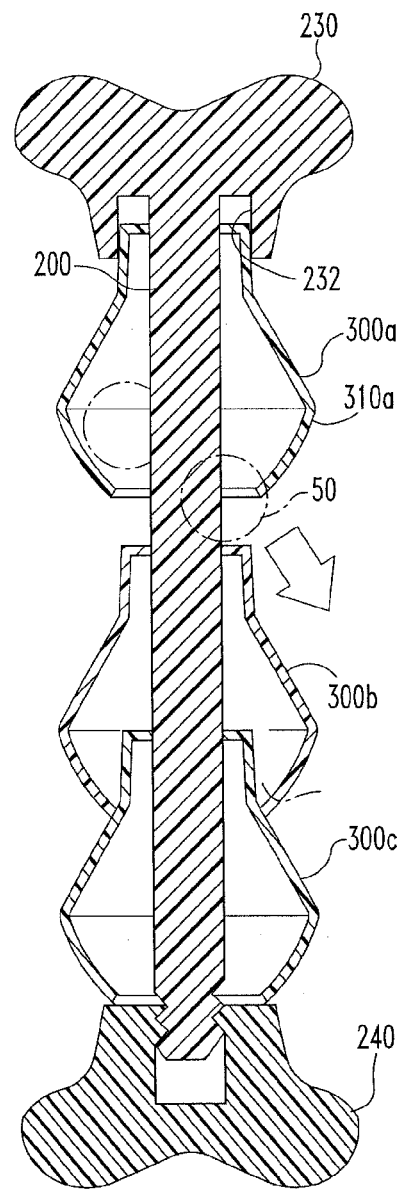
FIG.16A
FIG.16B

TREAT DISPENSER

CROSS-REFERENCE TO RELATED APPLICATION

The instant application claims priority from U.S. Provisional Patent Application Ser. No. 61/650,124 filed May 22, 2012, the disclosures of which are incorporated herein by reference.

FIELD OF THE INVENTION

The disclosed and claimed concept relates generally to a treat toy for animals and, more particularly, to a treat dispenser having, in one embodiment, a plurality of stackable and nestable flexible pods that are movably disposed on a support and that are each individually accessible for the loading and dispensing of treats to an animal.

BACKGROUND

Toys that dispense animal treats when the toy is rolled or otherwise manipulated are generally known in the relevant art. Such devices have a variety of forms and arrangements of holes and openings. These treat-discharging toys are generally comprised of a first opening for the insertion of treats, one or a plurality of second openings for the dispensing of treats, which second opening or openings may or may not be the same as the first opening, and a challenge feature that retains the treats within the toy until the toy is played with by the pet. The challenge feature could be, for example, an obstructed interior between the first and one or more second openings that causes a treat to rattle around in response to movement of the toy from the pet. Another challenge feature could, for example, hold the treat in one location that is only accessible if the pet chews or licks the toy.

Despite the advancements in the art, there is always a need for a treat dispenser which sustains a pet's attention for longer periods of time to entice the pet to play and maintain prolonged engagement and interest in the toy. Many pets have a relatively short attention span and are easily bored. It would be desirable to provide an improved treat dispenser which shortcoming in the relevant art.

SUMMARY

In accordance with one embodiment, there is provided a treat dispenser for an animal comprising a support and a plurality of coaxially stackable and nestable pods slidably disposed along the support, each pod having an interior for receiving a treat, a sidewall, a first opening and a second opening coaxial with the first opening, the first opening being dimensioned for slidable movement along the support, and the second opening being larger than the first opening for the dispensing of treats to an animal. Each of the pods is preferably independently movable and loadable with treats and the pods are then stacked or nested together to conceal the treat openings. Upon receiving a treat laden treat dispenser toy, an animal must separate the pods in order to gain access to the treats within each pod. The treat dispenser may be formed from material such as nylon, rubber or rope, for example, that is independently attractive to an animal and that functions to entertain the animal as a toy independent of the treat dispensing pods.

BRIEF DESCRIPTION OF THE DRAWINGS

FIG. 1 is an elevational view, partly cut away, of a treat dispenser in accordance with a first embodiment of the disclosed and claimed concept;

FIG. 2 is an exploded view of the treat dispenser of FIG. 1;

FIG. 16A illustrates a further movement of the treat pods;

FIG. 16B illustrates the dispensing of treats after the movement shown in FIG. 16A;

DETAILED DESCRIPTION

Figure 3:
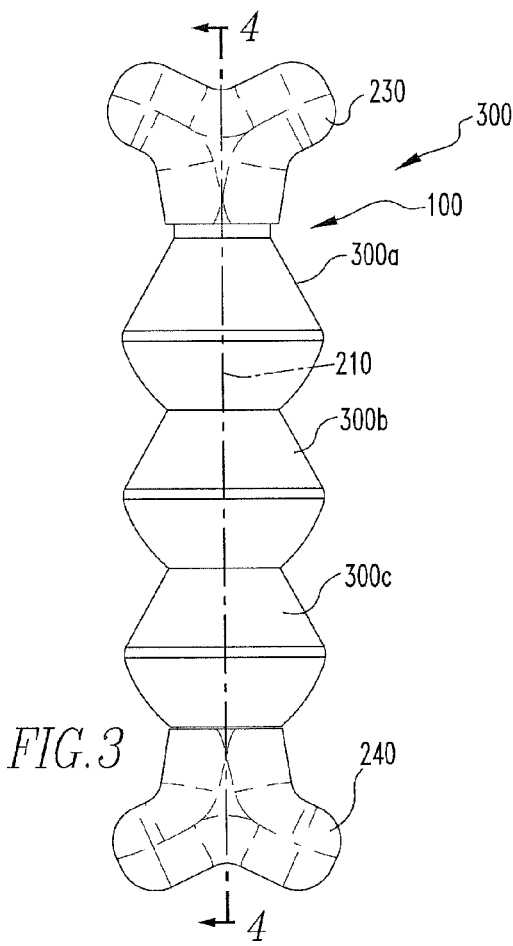
FIG. 3 is an elevational view of the treat dispenser of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and the like refer to a relationship wherein structures are secured or attached to one another either directly or indirectly through intervening structures, as well as both movable and rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features, the scope of the invention instead being defined by the claims appended hereto.

This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

Figure 6:
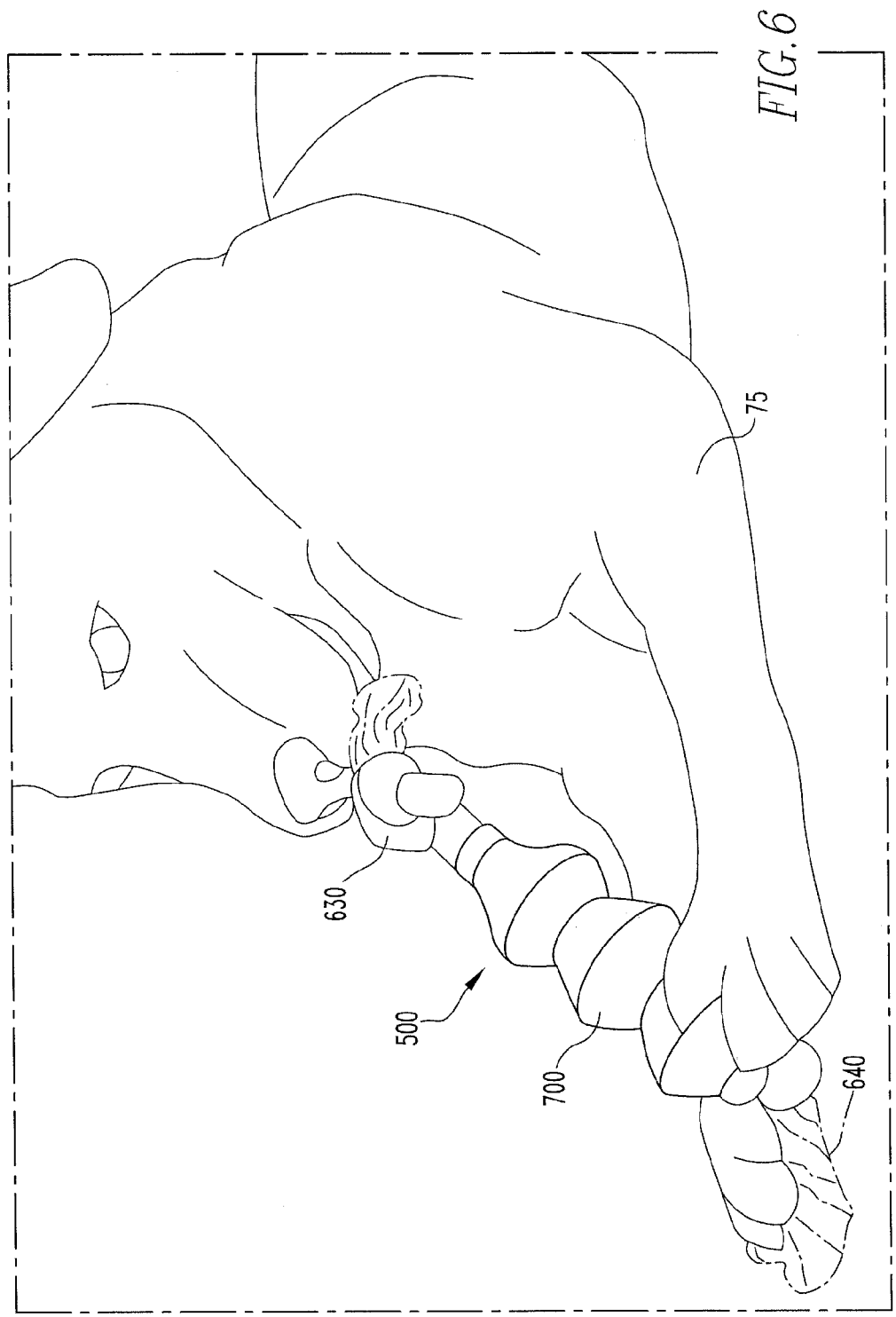
FIG. 6 is an illustration of use of the treat dispenser of FIG. 5.
Figure 7:
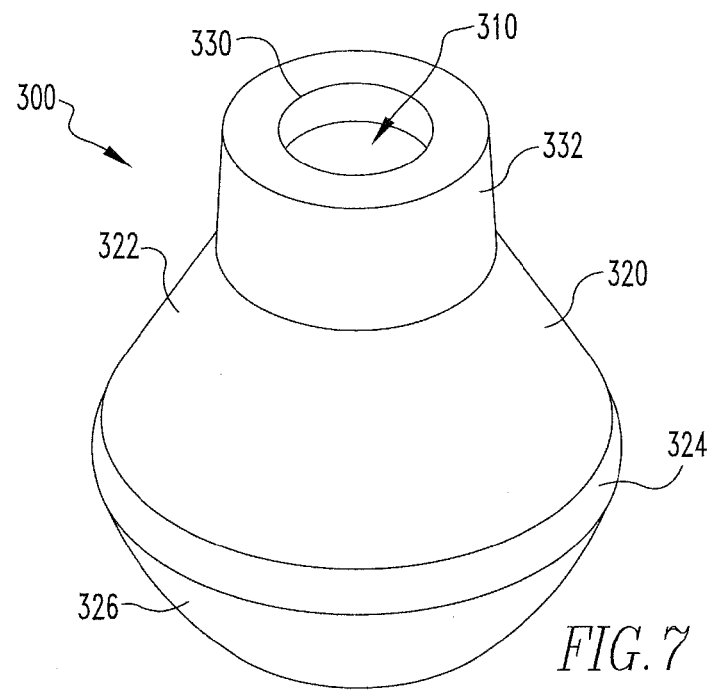
FIG. 7 is a perspective view of a treat pod of the treat dispenser of FIG. 1.
Figure 8:
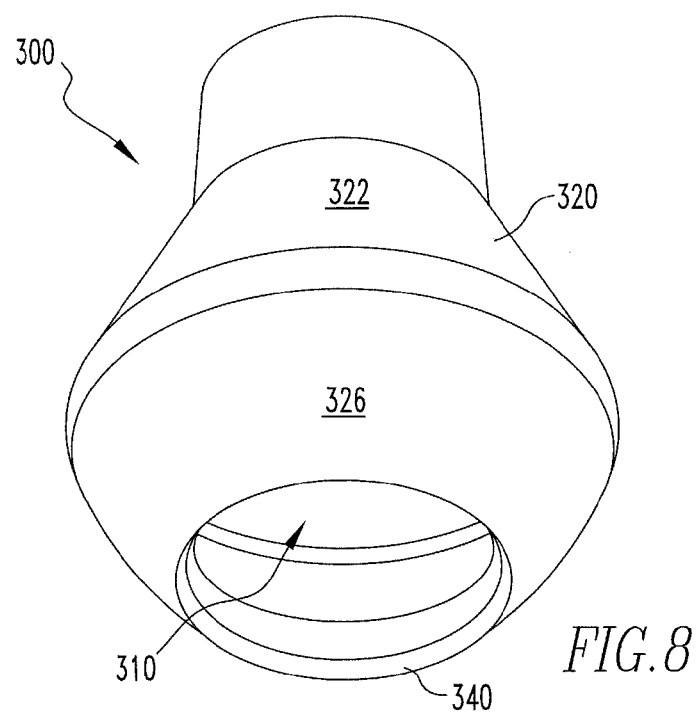
FIG. 8 is another perspective view of the treat pod of FIG. 7.
Figure 9:
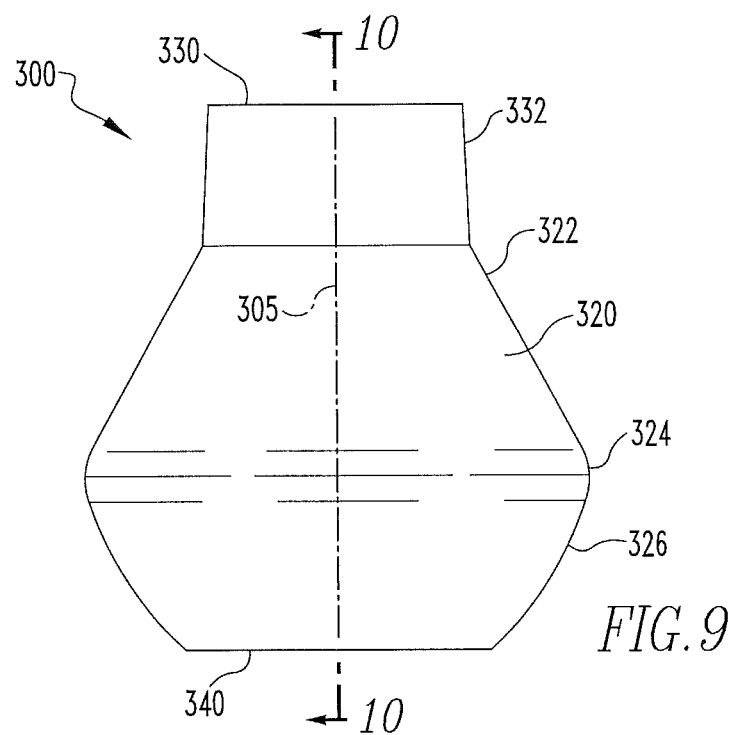
FIG. 9 is a side elevational view of the treat pod of FIG. 7.
Figure 10:
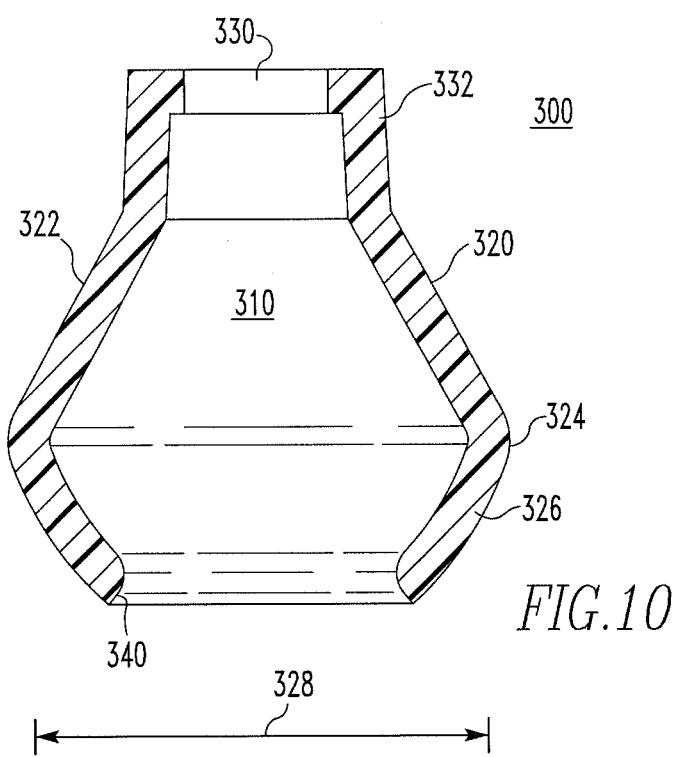
FIG. 10 is a section view as taken along line 10-10 of FIG. 9.
Figure 11:
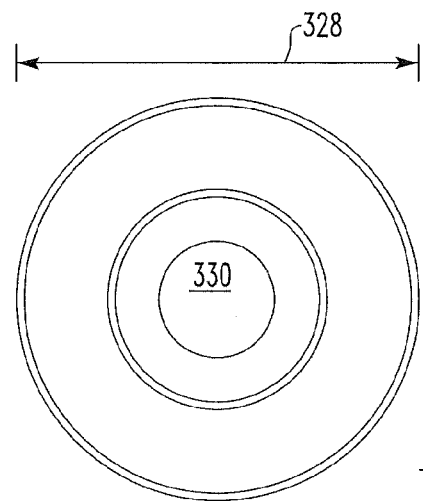
FIG. 11 is a top plan view of the treat pod of FIG. 7.

FIG. 1 illustrates a treat dispenser or treat dispenser toy 100 in accordance with a first embodiment of the disclosed and claimed concept that can be generally stated as including a support 200 having an axis 210 and a length 212, and a number of coaxially stackable treat pods 300 slidably disposed along the support 200 between a first limit 230 and a second limit 240. As employed herein, the expression "a number of" and variations thereof shall refer broadly to any non-zero quantity, including a quantity of one. As also described in connection with FIGS. 7-11, each pod 300 has an interior 310 surrounded by a sidewall 320, a first opening 330 for receiving the support 200, and a second opening 340 for the passage of treats 50 into and out of the interior 310. Each pod 300 serves as a receptacle element that is structured to receive, retain, and eventually dispense to an animal a treat. A "treat" as used herein is meant to include all animal foodstuffs that can be consumed by an animal, and it may take various forms such as uniformly sized nuggets, or the treat may be irregularly sized and shaped, or the treat may be liquid or semi-solid such as peanut butter or the like. Other shapes and configuration are possible. While three individual treat pods 300a, 300b, and 300c (generically or collectively described as pods 300) are shown, it will be appreciated with reference to the discussion below that a lesser quantity such as one or two pods 300 may be used, or more than three pods 300 may be used if desired, where the number of pods may vary with the size of each pod and the length 212 of the support 200. As will be described in more detail below, the pods 300 may be individually loaded with treats 50, preferably through the second opening 340, and then stacked and preferably nested onto each other and then presented to an animal 75 (see FIGS. 6 and 19), whereby the animal 75 proceeds to play with the treat dispenser 100 and manipulate the treat pods 300 until the treats 50 are dispensed.

Figure 4:
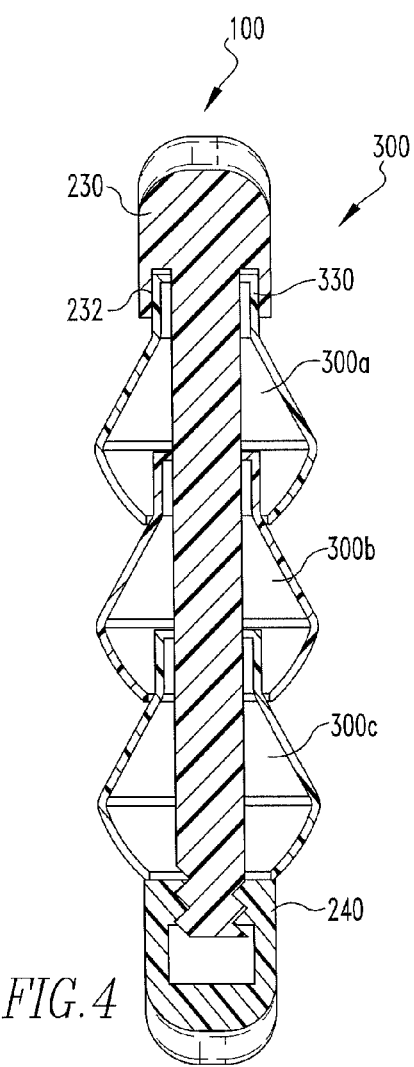
FIG. 4 is a sectional view as taken along line 4-4 of FIG. 3.

In the embodiment of FIG. 1, the body 220 of the support 200 is configured as a cylindrical rod having a substantially uniform cross-section, wherein the body 220 is preferably substantially rigid and is formed from a safe, non-toxic material such as nylon, synthetic or natural rubber, or some other similar plastic for example. Other rigid or semi-rigid materials are contemplated. The support 200 may have various shapes and configurations, such as a bone-shaped configuration as shown in FIG. 1 with the limits 230, 240 appearing to be knuckle or condyle portions of an actual bone. While the shape or configuration of the support 200 and the limits 230, 240 may be variable, the configuration of any selected support should allow for movement or sliding of the pods along the body, with the configuration of any selected limits preventing the pods from becoming removed from the body during normal use or play by an animal. Thus, the support 200 preferably constrains the slidable movement of the pods 300 along the axis 210 of the support 200 while the limits 230, 240 function to prevent the pods 300 from separating from the support 200 and may further function independently as a chew toy element for an animal. In one embodiment (not shown), the limits are fixed or non-removable relative to the support 200, which might occur during the manufacturing and assembly process after the pods 300 have been attached to the support body 220. One or more of the limits 230, 240 may be removable from the body 220, such as shown in the exploded perspective view of FIG. 2 and the assembled views of FIGS. 3-4 of the treat dispenser 100 of FIG. 1 having one end of the body 220 fixed to limit 230 and an opposite end of the body 220 threadably engageable with limit 240 for removable attachment of the limit 240 with the body 220. As shown in the cross-section of FIG. 4, limit 230 is formed as part of the body 220, such as by an injection molding manufacturing process, while limit 240 is removably attached to the body such as by a threaded connection. While limit 230 is shown as being fixed and limit 240 is shown as being removable, it will be appreciated that the arrangement of fixed and removable limits may be reversed, or that both limits 230, 240 may be fixed, or that both limits may be removable. Two benefits of being able to remove the pods 300 from the support 200 include the ability to clean the pods 300 and support 200 separately and the ability to replace worn or ineffective pods 300 that have degraded over time. Other functions and benefits are possible.

Figure 5:
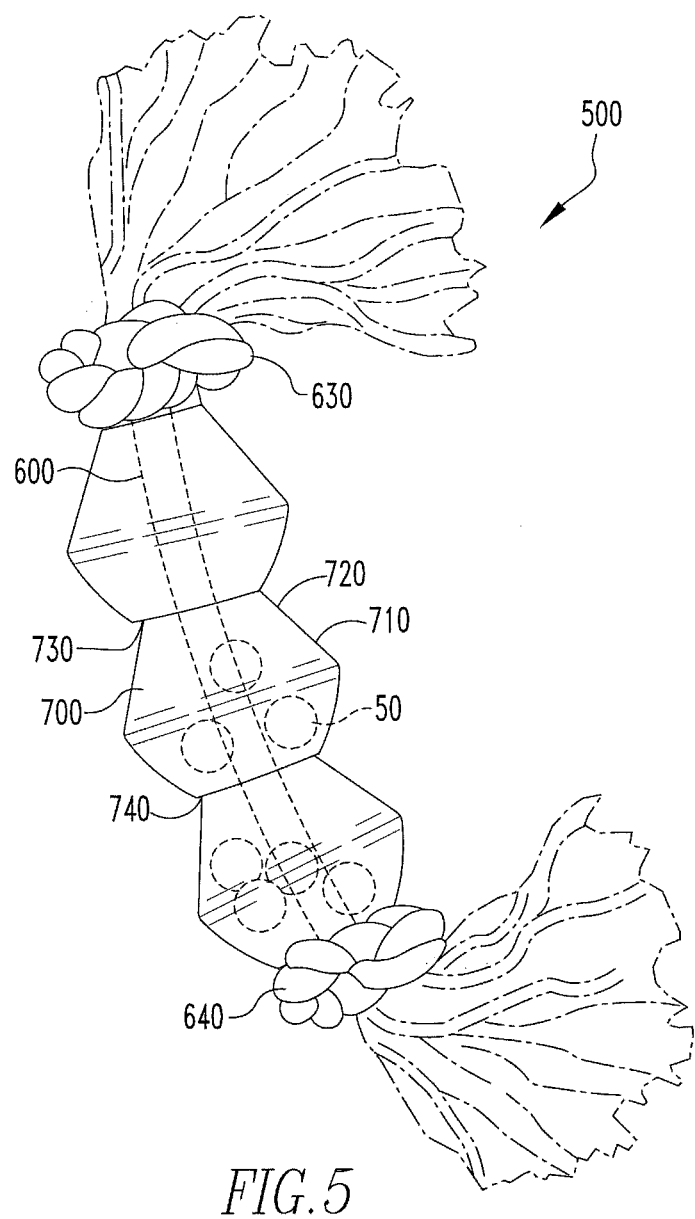
FIG. 5 is a perspective view of a treat dispenser in accordance with a second embodiment of the disclosed and claimed concept.

While a rigid or semi-rigid rod-like support 200 is shown in the embodiment of FIG. 1, it will be appreciated that other constructions are possible. For example, and as is depicted generally in FIGS. 5 and 6, a treat dispenser 500 in accordance with a second non-limiting embodiment of the disclosed and claimed concept includes a preferably non-rigid support 600 in the form of a rope, and a number of coaxially stackable pods 700 slidably disposed along the support 600 between a first limit 630 and a second limit 640 that are each formed from the same material as the support 600. The rope may be made from any material, although it is preferred to use cotton or a synthetic blend which is durable and washable. The pods 700 are substantially similar to the pods 300. Each pod 700 has an interior 710 surrounded by a sidewall 720, a first opening 730 for receiving the support 600, and a second opening 740 for the passage of treats 50 into and out of the interior 710. In the embodiment of FIG. 5, the ends of the rope support 600 are knotted to form the limits 630, 640, which are wide enough to constrain the pods 700 to the support 600 such that the pods 700 are not removable from the support 600. Thus, during one aspect of a manufacturing process, the pods 700 would be initially attached to the support 600 and then the limits 630, 640 or knots would be formed around the pods 700. The animal 75 is able to play with the knots 630, 640 of the treat dispenser 500 as a rope toy in addition to a treat toy as shown, for example, in FIG. 6.

FIGS. 7-11 illustrate the treat-dispensing pods 300, 700 (pod 300 will be described and illustrated for ease of explanation) for use with the treat dispenser toys 100, 500 of the various embodiments described herein, or for use with other similarly-functioning treat dispensers that come within the scope of the present disclosure even though not shown herein. The illustrated embodiment of the pod 300 further comprises an interior 310 for receiving a treat 50 (see FIG. 1, for example) and having a central axis 305 (FIG. 9), a sidewall 320 that is preferably flexible, a first opening 330 with a first adjacent sidewall portion 322 depending therefrom, and a second opening 340 with a second adjacent sidewall portion 326 depending therefrom. The first and second openings 330, 340 are coaxial with the central axis 305 and are sized to receive the support body 220 therethrough to allow for the sliding of the treat pod 300 along the support axis 210. The first and second adjacent sidewall portions 322, 326 meet one another at a waist 324 having the relatively largest diameter 328 (FIGS. 10-11) of the sidewall 320. Each pod is preferably made from a durable material such as natural rubber or a synthetic rubber such as TPE (thermoplastic elastomer) or a thermoplastic rubber, wherein the material can be opaque, transparent, translucent, colored, or a combination of the same. Using a transparent or semi-translucent material allows an animal to view the treats contained within. Other materials are contemplated.

In the illustrated embodiment, the first opening 330 of the treat pod 300 is preferably smaller than the second opening 340, wherein the first opening 330 functions primarily to retain the treat pod 300 on the support body 220, while the larger second opening 340 functions primarily to receive and dispense treats 50 as will be described below. The first opening 330 is preferably dimensioned to resist the passage of treats therethrough, although with certain flowable treat items such as peanut butter, for example, some treat material may ooze through the first opening 330 and/or coat the support body 220 during the interaction of the animal with the toy 100. In the illustrated embodiment, the first opening 330 is surrounded by a collar 332 that forms a periphery of the first opening 330. This optional collar 332 increases the rigidity of the first adjacent sidewall portion 322 around the first opening 330, which resists the first opening 330 from being bent or peeled back by an animal or the like. The collar 332 may also be used to engage a peripheral groove 232 (FIG. 4) in the first limit 230 in order to retain the collar 332 and the treat pod 300 relative to the first limit 230. However, the second opening 340, which is larger than the first opening 330, forms the terminus of the second adjacent sidewall portion 326 and is more bendable or capable of being peeled back or away from the central axis 305 to expose more of the interior 310 through the second opening 340. The bendability of the second opening 340 is due in part to the lack of a reinforcing element such as the presence of a collar (not shown) along the periphery of the second opening 340. Additional factors affecting the bendability of the sidewall 320 adjacent the second opening 340 include, but are not limited to, the thickness of the sidewall 320 wherein a thinner sidewall 320 will generally be more bendable than a thicker sidewall, and the slope of the second adjacent sidewall portion 326 relative to the central axis 305 wherein a slope that is closer to parallel or perpendicular to the central axis 305 would result in a less bendable second opening 340, while a slope that is closer to forty-five degrees relative to the central axis 305, for example, would tend to be more bendable. Other bendable dimensions and configurations are possible.

Figure 12:
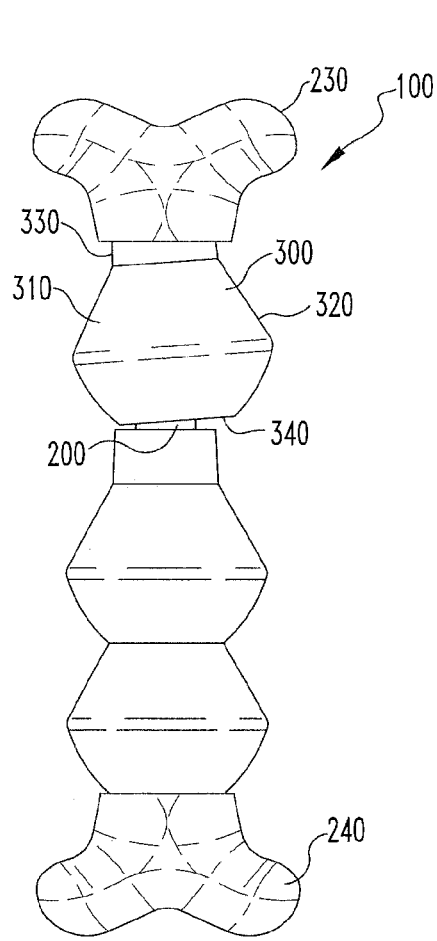
FIG. 12 is a front elevational view of the treat dispenser of FIG. 1 that illustrates a pivoted treat pod.

FIG. 12 illustrates one embodiment of the treat dispenser 100 wherein the pod 300 is pivotable on the support 200 relative to the first opening 330 in order to vary the position of the second opening 340 relative to the support 200 and increase access to the interior 310 of the treat pod 300. It can be understood from FIG. 12 that upon such pivoting of the pod 300, the central axis 305 is oriented generally oblique to the axis 210. Because the second opening 340 is larger than the first opening 330, treats 50 are preferably inserted into the interior 310 through the second opening 340. Each treat pod 300 is preferably independently movable along the support 200 so that each treat pod 300 may be slidably spaced away from an adjacent treat pod a sufficient distance to allow the treat pod to be pivoted outward in preparation for the insertion of treats 50. Once a treat pod 300 is loaded with treats 50, the loaded treat pod is moved along the support 200 in order to make room for the pivoting of another treat pod in preparation to receive treats 50.

Figure 13:
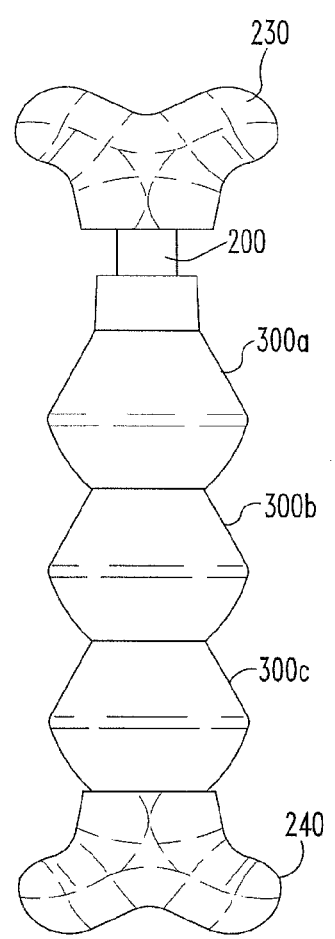
FIG. 13 is a front elevational view of the treat dispenser of FIG. 1 that illustrates a nested arrangement of treat pods.

Once all of the treat pods 300 have been loaded with treats 50, the pods are coaxially stacked and preferably nested or seated onto each other as shown in FIGS. 1 and 13 to conceal the treats 50 and to cover or otherwise create a barrier to the second opening 340 of each pod. In one embodiment, this is accomplished by advancing the second opening 340 of one pod 300 over the first opening 330 of an adjacent pod and compression fitting the two together through the flexibility of the sidewall 320, with the second opening 340 being against the first adjacent sidewall portion 322 of the adjacent pod. Thereafter, the treat toy 100 is provided to an animal whereby the animal bites and causes the treat pods 300 to move relative to each other and relative to the support 200 in order to expose the second opening 340 of each pod and cause treats 50 retained within the interior 310 to be dispensed through the second opening 340.

Figure 14A:
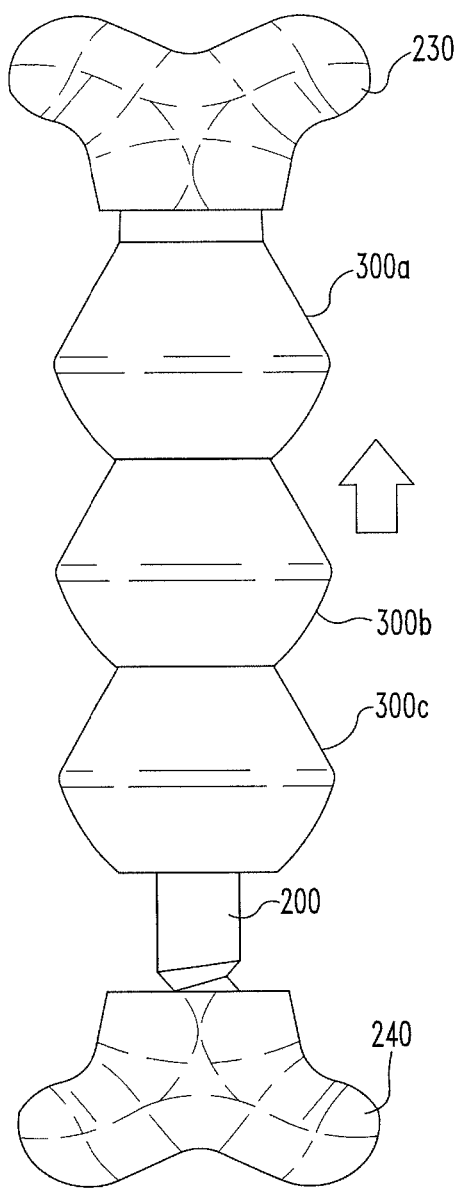
FIG. 14A is a front elevational view of the treat dispenser of FIG. 1 that illustrates a movement of the treat pods.
Figure 14B:
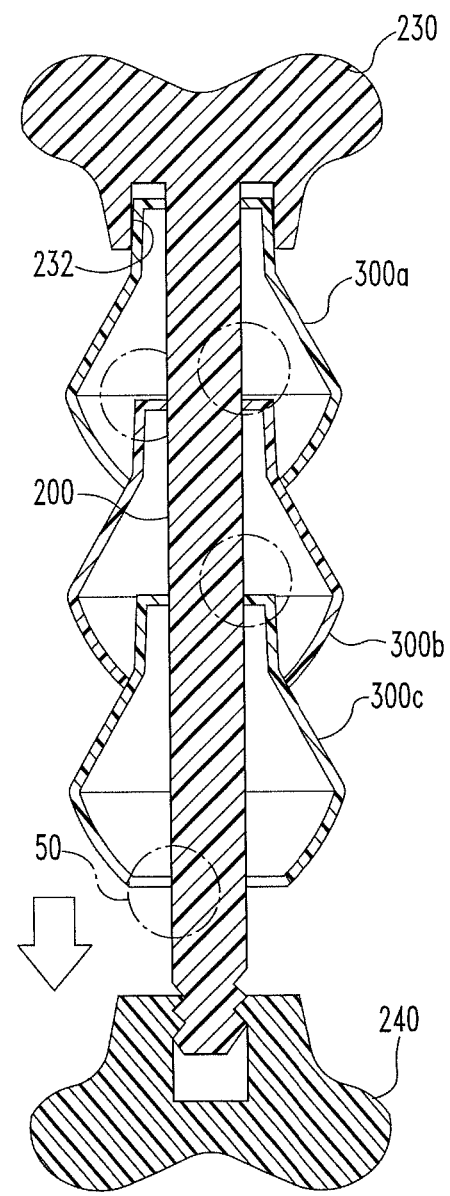
FIG. 14B illustrates the dispensing of treats after the movement shown in FIG. 14A.
Figure 15A:
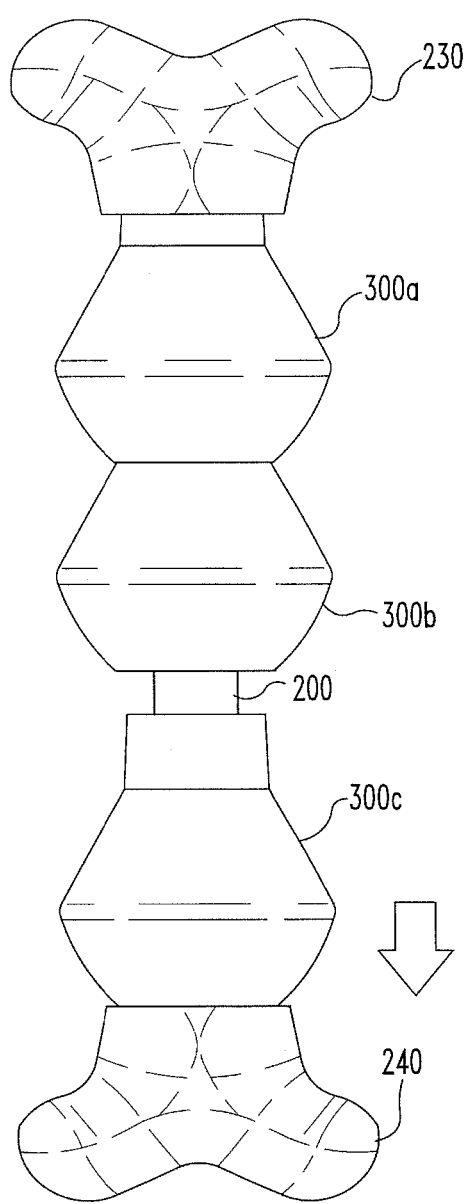
FIG. 15A illustrates another movement of the treat pods.
Figure 15B:
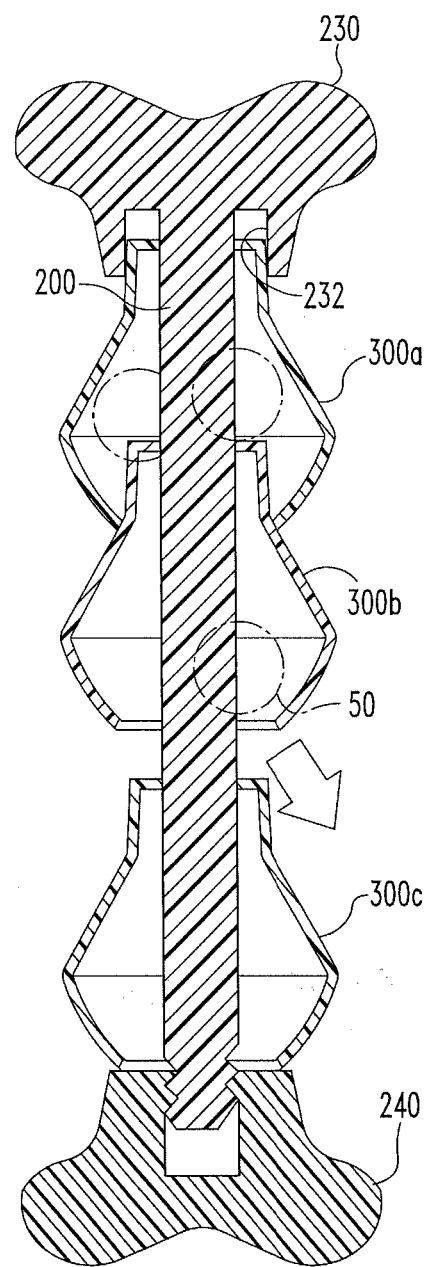
FIG. 15B illustrates the dispensing of treats after the movement shown in FIG. 15A.

FIG. 13 (and FIG. 1) shows one embodiment of a treat dispenser toy 100 loaded with treats 50. The arrangement of the treat pods 300a, 300b, and 300c, along the support 200 creates a variable challenge for an animal in terms of accessing treats within each treat pod as shown in the different treat-accessing scenarios of FIGS. 14A-16B. Due to the stacking of the treat pods 300 and the ability of an animal to collectively move a series of stacked treat pods along the support 200, the bottom-most (from the perspective of FIG. 13) treat pod 300c tends to be the easiest for an animal to access, and more specifically the second opening of such pod 300c, due to the ability of the animal to simultaneously move all of the pods 300a, 300b, and 300c away from the second limit 240 (FIG. 14A) in order to reveal the second opening 340c of the treat pod 300c (FIG. 14B) for access to the treats within the interior 310c. For example, an animal might be able to hold or support the second limit 240 and nudge with its muzzle all of the treat pods 300a, 300b, and 300c away from the second limit 240 in order to access the treats in the pod 300c. Similarly, a medium-level challenge is presented for the animal to displace only the treat pod 300c toward the second limit 240 while the treat pods 300a, 300b remain stacked and nested together at the first limit 230 (FIG. 15A), which would then reveal the second opening 340 of the treat pod 300b (FIG. 15B). For example, an animal might be able to hold or support the first limit 230 and bite down on the tread pod 300c (see also FIG. 19) and pull such pod 300c toward the animal and thereby reveal the second opening 340. However, the greatest challenge is presented for the animal to retain in place only the treat pod 300a while displacing away the other treat pods 300b, 300c toward the second limit 240 (FIG. 16A), which would then reveal the second opening 340 of the treat pod 300a and allow the animal to extract treats 50 from the interior 310 thereof (FIG. 16B). For example, an animal might be able to hold or support the first treat pod 300a along with the first limit 230 (see also FIG. 6) and bite down on the tread pod 300b and/or the tread pod 300c and pull such pods 300b, 300c toward the animal and thereby revealing the second opening 340 from the pod 300a.

Figure 17:
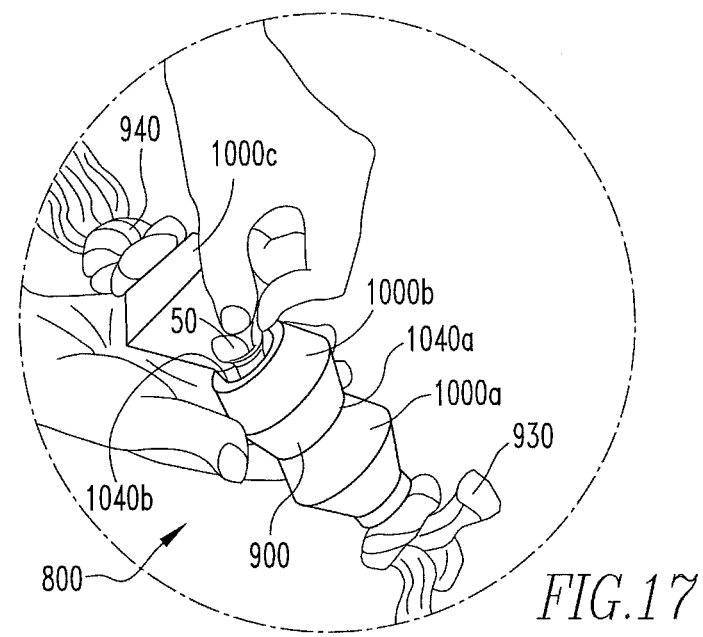
FIG. 17 illustrates a treat being loaded into a treat pod of an embodiment of the treat dispenser which is similar to that of FIG. 5.
Figure 18:
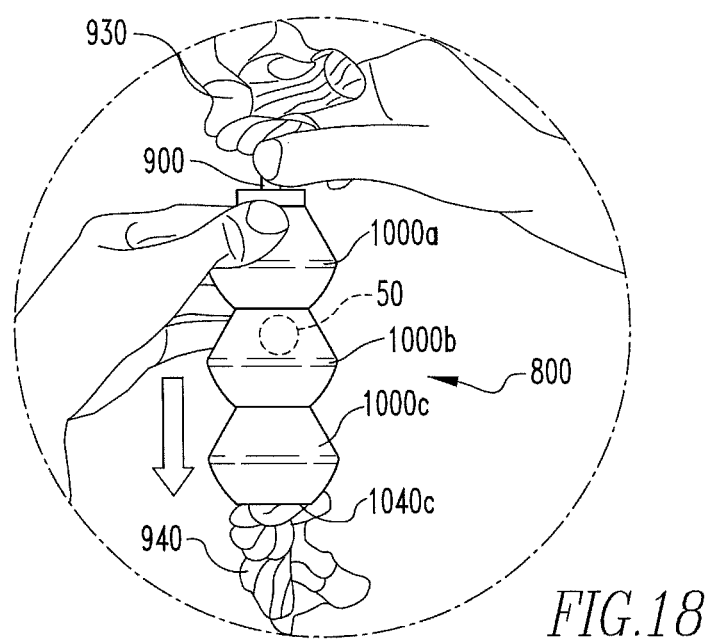
FIG. 18 illustrates the stacking or nesting of the treat pods of the treat dispenser of FIG. 17.
Figure 19:
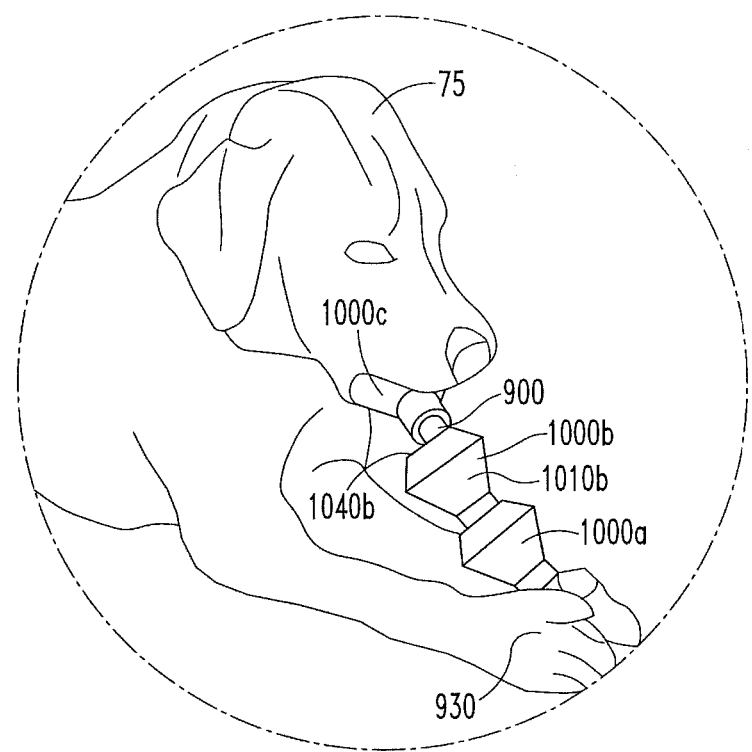
FIG. 19 illustrates treat dispenser of FIG. 17 in use.

FIGS. 14A-16B illustrate use of a treat dispenser toy 100 having pods 300 supported along a rod-like support 200. Similar to the toy 500 of FIG. 5, FIGS. 17-19 show a non-limiting embodiment of a treat dispenser toy 800 having a preferably flexible, i.e., non-rigid support 900 in the exemplary form of a rope, the treat dispenser toy 800 further having a number of coaxially stackable and nestable pods 1000 (individual pods 1000a, 1000b and 1000c) slidably disposed along the support 900 between a first limit 930 and a second limit 940 that are each formed from the same material as the support 900. More specifically, FIG. 17 illustrates the insertion of a treat 50 through the second opening 1040b of a pivoted pod 1000b where the pod 1000b is nested within the second opening 1040a of the pod 1000a, and the pod 1000c is spaced toward the second limit 940 and away from the nested pods 1000a, 1000b. FIG. 18 illustrates the tight nesting together of the treat-laden pods 1000a, 1000b, and 1000c and the positioning of the second opening 1040c of the pod 1000c against the second limit 940. FIG. 19 illustrates an animal 75 separating the pod 1000c from the other nested pods 1000a, 1000b for purposes of gaining access to the second opening 1040b from the pod 1000b and the treats within the interior 1010b of the pod 1000b.

Figure 20:
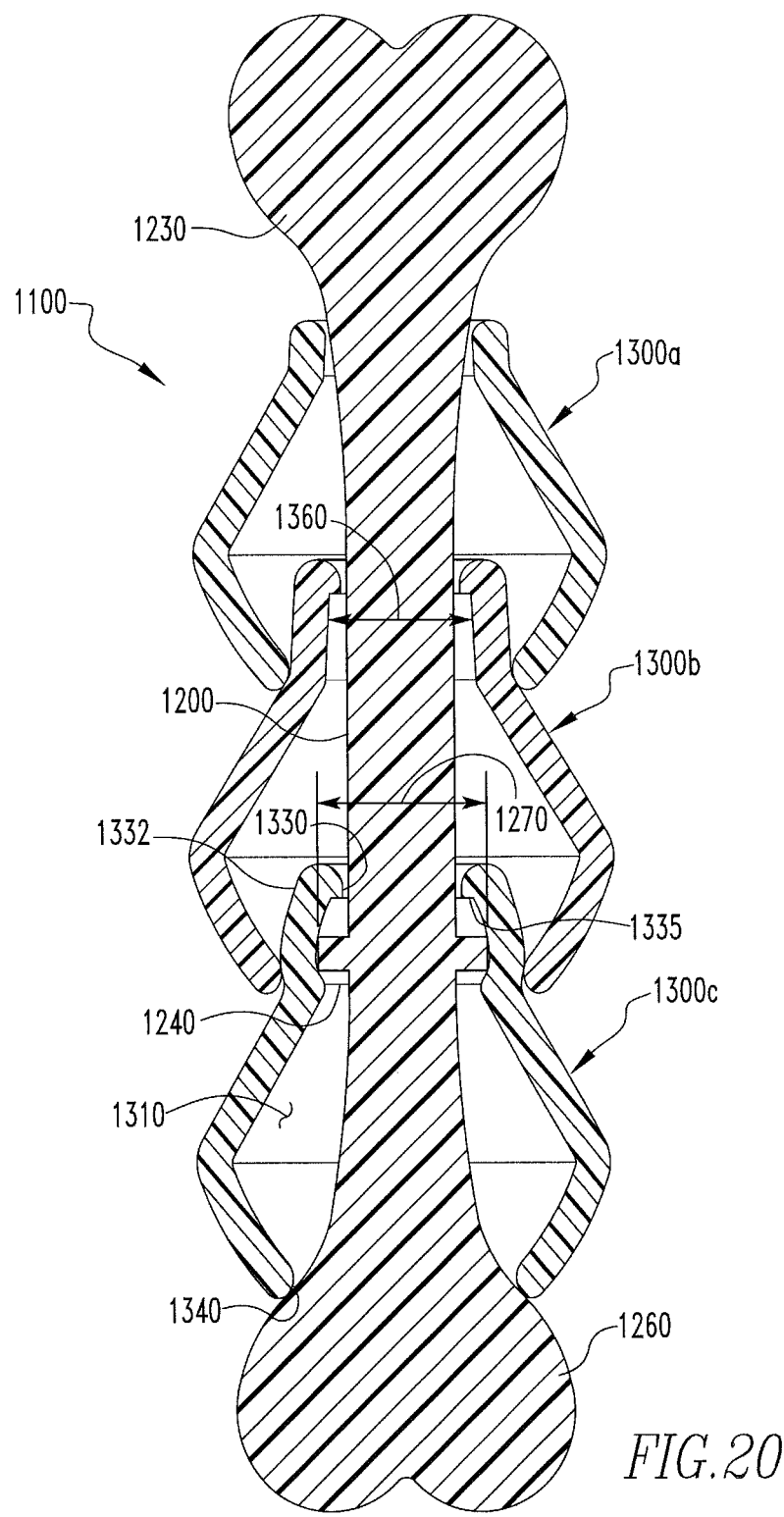
FIG. 20 is a sectional view of a treat dispenser in accordance with a third embodiment of the disclosed and claimed concept.

FIG. 20 illustrates an improved treat dispenser 1100 in accordance with a third embodiment of the disclosed and claimed concept. The treat dispenser 1100 is similar to the treat dispenser 100, except that the treat dispenser 1100 has some structural and other differences. More specifically, the treat dispenser includes an elongated cylindrical support 1200 having a pair of opposite dogbone-shaped ends, i.e., a first end 1230 and a second end 1260. The dogbone shaped first end 1230 serves as a first limit 1230. However, the support 1200 additionally has an annular flange 1240 protruding radially therefrom that serves as a second limit 1240. That is, the second limit 1240 protrudes outwardly from the support 1200 in a direction generally transverse to the longitudinal extent of the support 1200. The second limit 1240 is spaced from the second end 1260 and is receivable in the interior of a collar 1332 of a pod 1300c to resist movement of the pods 1300c and a pair of additional pods 1300a and 1300b beyond the second end 1260. That is, whereas the first limit 1230 is at the first end 1230, the second limit 1240 is spaced from the second end 1260 and is disposed between the first and second ends 1230 and 1260.

Depending upon the size of an animal 75 and the force with which the animal 75 plays with the treat dispensers disclosed and claimed herein, it may be possible for the animal to push a pod 300 beyond the second limit 240 of the treat dispenser 100. In this regard, it is noted that the second opening 340 is meaningfully larger than the first opening 330 and, since the pod 300 is elastomeric, the second opening 340 potentially may be stretched sufficiently to enable it to pass beyond the second limit 240. However, the treat dispenser 1100 is configured such that the second limit 1240 interacts with the pod 1300c in the vicinity of its first opening 1330.

That is, the second limit 1240 is receivable in the interior of the collar 1332 upon elastic deformation of the collar 1332 of a degree that is sufficient to permit the second limit 1240 to be received therein. The interior 1310 in the vicinity of the collar 1332 can be said to have in its free state a given diameter 1360, which is depicted in connection with the pod 1300b which is in a free state. The second limit 1240 has a diameter 1270 that is greater than the diameter 1360 of the collar 1332 in its free state. As such, the collar 1332 must be elastically deformed, i.e., stretched, in order to advance the second limit 1240 into the collar 1332 coincident with translation of the pod 1300c in a direction toward the second end 1260. The diameters 1270 and 1360 are configured to resist advancement of the second opening 1340 of the pod 1300c beyond the second end 1260. Additionally, an annular stop 1335 can be formed at the first opening 1330 that extends radially inwardly from the collar 1332 at the first opening 1330 and that is engageable with the second stop 1240 in order to provide a backstop in the event that the animal 75 is able to apply sufficient force to the pod 1300c and/or the support 200 to cause the second limit 1240 to be advanced through the entirety of the collar 1332.

Additionally, the first and second ends 1230 and 1260 are affixed to the support 1200 rather than one of them being threadably removable as in the case of the support 200 and the second limit 240. Such affixing of the first and second ends 1230 and 1260 to the support 1200 provides further tensile strength to the treat dispenser 1100. It is also noted that the first end 1230 does not have a peripheral groove formed therein, which is different from the first limit 230 which has the peripheral groove 232 formed therein.

The various embodiments of the treat dispenser toy described herein provide an animal with a variety of different auditory and visual experiences that create an enjoyable and interactive experience for a pet, in addition to the dispensing of treats from the treat pods. For example, the treat dispenser toy 100 of FIG. 1 provides a rigid support 200 with rigid end limits 230, 240 that can also function as a hard chew toy 500 like a nylon or rubber bone. In another example, the treat dispenser toy 500 of FIG. 5 provides a non-rigid support 600 in the form of a rope with non-rigid end limits 630, 640 in the form of rope knots with frayed or partially frayed ends that can also function as a rope tug or a rope chew toy. The treat dispenser 1100 has modified limits 1330 and 1340 and other modified structures which resist destruction, which enables it to be used, for instance, with a relatively large or aggressive dog. In addition, the treat dispensing pods provide a movable, flexible material that can be chewed, pulled, pushed, tugged and crushed to reveal treats and the like. Furthermore, while the treat dispenser toys 100, 500, and 800 have been generally described herein as having three treat pods, it will be appreciated that any number of treat pods may be used as long as a support is provided that is long enough or short enough to handle the number of treat pods actually used.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the relevant art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A treat dispenser structured to receive and dispense treats, comprising:
   an elongated support member having a first limit and a second limit; and
   a plurality of receptacle elements that are resilient, each of the receptacle elements having an interior region that is structured to receive the treats, and having a first opening and a second opening that are in communication with the interior region, the second opening being larger than the first opening and configured to dispense the treats,
   the support member extending through each of the first openings and the second openings, at least two receptacle elements of the plurality of receptacle elements being slidable in use on the support member between the first and second limits to dispense the treats from the second opening to an exterior of the treat dispenser.

2. The treat dispenser of claim 1, wherein
   each of the at least two receptacle elements comprises a collar within which the first opening is formed, the collar of a first receptacle element of the at least two receptacle elements being receivable in the second opening of a second receptacle element of the at least two receptacle elements to enable nesting of the first receptacle element with the second receptacle element.

3. The treat dispenser of claim 2, wherein
   the collar of the first receptacle element is situated about a periphery of the first opening of the first receptacle element and is structured to resist bending of the first receptacle element adjacent the first opening.

4. The treat dispenser of claim 3, wherein
   each of the at least two receptacle elements comprises a sidewall adjacent the second opening that is structured to be bendable.

5. The treat dispenser of claim 1, wherein
   each of the at least two receptacle elements are pivotable on the support member about the first opening to adjust accessibility to the interior region through the second opening.

6. The treat dispenser of claim 1, wherein
   the support member has a first end and a second end defining the first limit and the second limit.

7. The treat dispenser of claim 6, wherein
   at least one of the first limit and the second limit is disposed on the support member and protrudes therefrom in a direction transverse to a longitudinal extent of the support member.

8. A treat dispenser structured to receive and dispense treats, comprising:
   an elongated support member having a first limit and a second limit; and
   a plurality of receptacle elements that are resilient, each of the receptacle elements having an interior region that is structured to receive the treats, and having a first opening and a second opening that are in communication with the interior region, the second opening being larger than the first opening and configured to dispense the treats,
   the support member extending through the first opening and the second opening, at least two receptacle elements of the plurality of receptacle elements being slidable on the support member between the first and second limits so that the at least two receptacle elements are capable of separating to dispense the treats from the second opening to an exterior of the treat dispenser.

9. The treat dispenser of claim 8, wherein
   each of the at least two receptacle elements comprises a collar within which the first opening is formed, the collar of a first receptacle element of the at least two receptacle elements being receivable in the second opening of a second receptacle element of the at least two receptacle elements to enable nesting of the first receptacle element with the second receptacle element.

10. The treat dispenser of claim 9, wherein
    the collar of the first receptacle element is situated about a periphery of the first opening of the first receptacle element and is structured to resist bending of the first receptacle element adjacent the first opening.

11. The treat dispenser of claim 10, wherein
    each of the at least two receptacle elements comprises a sidewall adjacent the second opening that is structured to be bendable.

12. The treat dispenser of claim 8, wherein
    each of the at least two receptacle elements are pivotable on the support member about the first opening to adjust accessibility to the interior region through the second opening.

13. The treat dispenser of claim 8, wherein
    the support member has a first end and a second end defining the first limit and the second limit.

14. The treat dispenser of claim 13, wherein
    at least one of the first limit and the second limit is disposed on the support member and protrudes therefrom in a direction transverse to a longitudinal extent of the support member.

* * * * *